United States Patent
Shi et al.

(10) Patent No.: US 9,360,307 B2
(45) Date of Patent: Jun. 7, 2016

(54) STRUCTURED-LIGHT BASED MEASURING METHOD AND SYSTEM

(75) Inventors: Danwei Shi, Guangdong (CN); Di Wu, Guangdong (CN); Wenchuang Zhao, Guangdong (CN); Qi Xie, Guangdong (CN)

(73) Assignee: SHENZHEN TAISHAN ONLINE TECHNOLOGY CO., LTD, Shenzhen (CN)

( * ) Notice: Subject to any disclaimer, the term of this patent is extended or adjusted under 35 U.S.C. 154(b) by 734 days.

(21) Appl. No.: 13/696,785

(22) PCT Filed: May 7, 2010

(86) PCT No.: PCT/CN2010/072528
§ 371 (c)(1),
(2), (4) Date: Nov. 7, 2012

(87) PCT Pub. No.: WO2011/137596
PCT Pub. Date: Nov. 10, 2011

(65) Prior Publication Data
US 2013/0050476 A1    Feb. 28, 2013

(51) Int. Cl.
*H04N 7/18* (2006.01)
*G01B 11/25* (2006.01)
*G06T 7/00* (2006.01)

(52) U.S. Cl.
CPC .......... *G01B 11/2545* (2013.01); *G06T 7/0057* (2013.01); *G06T 2207/10012* (2013.01)

(58) Field of Classification Search
None
See application file for complete search history.

(56) References Cited

U.S. PATENT DOCUMENTS 6,466,305 B1 * 10/2002 McBain ................. 356/3.08
7,522,268 B2 * 4/2009 Kumagai et al. ......... 356/5.01
(Continued)

FOREIGN PATENT DOCUMENTS

CN    1483999 A    3/2004
CN    1595054 A    3/2005
(Continued)

OTHER PUBLICATIONS

International Search Report issued in Application No. PCT/CN2010/072528, dated Feb. 10, 2011.
(Continued)

*Primary Examiner* — Kate Luo
(74) *Attorney, Agent, or Firm* — Venable LLP; Henry J. Daley

(57) ABSTRACT

A structured-light measuring method, includes: matching process, in which the number and the low-precision depth of a laser point are achieved by using the imaging position of the laser point on a first camera (21) according to a first corresponding relationship in a calibration database, and the imaging position of the laser point on a second camera (22) is searched according to the number and the low-precision depth of the laser point so as to acquire the candidate matching points, then the matching process is completed according to the imaging position of the first camera (21) and the candidate matching points of the imaging position of the first camera (21) on the second camera (22) so that a matching result is achieved; and computing process, in which the imaging position of the second camera (22) matching with the imaging position of the first camera (21) is achieved according to the matching result, and then the precision position of the laser point is determined by a second corresponding relationship in the calibration database. A structured-light measuring system utilizes the above measuring method.

14 Claims, 2 Drawing Sheets

(56) References Cited

U.S. PATENT DOCUMENTS

2003/0038933 A1* 2/2003 Shirley et al. ............... 356/243.1
2009/0066929 A1* 3/2009 Tropf ........................... 356/3.12

FOREIGN PATENT DOCUMENTS

| CN | 101089547 A | 12/2007 |
|---|---|---|
| CN | 101689299 A | 3/2010 |
| JP | 2006-90896 A | 4/2006 |
| WO | WO-2005-010825 A3 | 2/2005 |
| WO | WO-2007-079805 A1 | 7/2007 |

OTHER PUBLICATIONS

Written Opinion issued in Application No. PCT/CN2010/072528, dated Feb. 10, 2011.

* cited by examiner

STRUCTURED-LIGHT BASED MEASURING METHOD AND SYSTEM

TECHNICAL FIELD

The present application relates to a structured-light based measuring method and a structured-light based measuring system employing such a method, and particularly to a structured-light based measuring method and a structured-light based measuring system employing such a method with a high measurement precision.

TECHNICAL BACKGROUND

For a structured-light based measuring system, if a light beam spot and its corresponding coordinate Z are known, the coordinate of a cross point of the light beam on the surface of an object may be obtained. For this purpose, during the demarcation of the structured-light based measuring system, light beams of the structured-light are designed in such a way that the image distribution of a light beam of the structured-light does not overlap that of a neighboring beam of the structured-light within a camera, and the respective image positions are recorded for various depths (i.e. the coordinates Z). During the practical measurement, it is possible to quickly determine a light beam corresponding to an already known image point in a manner of determining a light beam corresponding to the demarcated image point that is closest to the known image point. An interpolating method may be used for determining 3D coordinates of the known image point. In an existing structured-light based measuring system, for the purpose of ensuring that the image distributions of any two light beams at different depths do not overlap with each other, it is necessary to concentrate the image distribution of each light beam, that is, a small image displacement corresponds to a large physical depth difference, which results in a low measuring precision.

SUMMARY OF THE INVENTION

In view of the defect of a low measurement precision in the above structured-light based measuring system in the prior art, the technical problem to be addressed by the present invention is to provide a structured-light based measuring method and a structured-light based measuring system using such a method.

To address the technical problem, the present invention provide a technical solution that includes a structured-light based measuring method including:

a matching process, which includes obtaining a sequence number and a low-precision depth of a laser light spot based on an image position of the laser light spot within a first camera according to a first mapping relationship in a demarcation database, searching for image positions of the laser light spot within a second camera according to the sequence number and the low-precision depth of the laser light spot to obtain candidates of matching point, and conducting matching according to the image position of the laser light spot within the first camera and the respective candidates of matching point within the second camera, to obtain a result of the matching; and a calculating process, which includes obtaining an image position within the second camera that matches with the image position within the first camera according to the result of the matching, and determining a precise position of the laser light spot according to a second mapping relationship in the demarcation database.

In the inventive structured-light based measuring method, the demarcation database is obtained by a demarcating process including:

demarcating the first mapping relationship between an image position of each laser light spot within the first camera and the sequence number as well as the low-precision depth of the laser light spot, demarcating the second mapping relationship between an image position of each laser light spot within the second camera and the sequence number as well as the high-precision depth of the laser light spot, and storing the demarcated first and second mapping relationships in a memory to form the demarcation database for the use by the matching process and the calculating process.

In the inventive structured-light based measuring method, during the demarcating process, a position of a laser output port relative the first camera is adjusted to prevent image positions of any two laser light spots within the first camera from overlapping with each other.

In the inventive structured-light based measuring method, the distance between the second camera and the laser output port is larger than the distance between the first camera and the laser output port.

In the inventive structured-light based measuring method, the demarcating process and the matching process are performed in a condition that image positions at different depths of the same laser light spot are surrounded by a geometric region.

In the inventive structured-light based measuring method, the precise position of the laser light spot is obtained by an interpolating method applied on the image position in the second camera and the high-precision depth during the calculating process.

In the inventive structured-light based measuring method, conducting matching according to the image position of the laser light spot within the first camera and the respective candidates of matching point within the second camera during the matching process includes: searching for a reference matching pair according to a luminance difference of images of the laser light spot; and determining the optimal matching point using the reference matching pair.

In the inventive structured-light based measuring method, during the conducting matching according to the image position of the laser light spot within the first camera and the respective candidates of matching point within the second camera in the matching process, before searching for a reference matching pair according to a luminance difference of images of the laser light spot, the method further includes: conducting a 3D reconstruction of the candidates of matching point, to obtain a depth of each of the candidate of matching point; and conducting initial selection among the candidates of matching point according to the depths of the candidates of matching point.

There is provided a structured-light based measuring system, including a processing system, an imaging system and a projecting system, where the imaging system includes a first camera and a second camera, the projecting system includes a laser generator for generating laser light, and the processing system includes a matching module and a calculating module, the matching module is adapted for obtaining a sequence number and a low-precision depth of a laser light spot based on an image position of the laser light spot within a first camera according to a first mapping relationship in a demarcation database, searching for image positions of the laser light spot within a second camera according to the sequence number and the low-precision depth of the laser light spot to obtain candidates of matching point, and conducting matching according to the image position of the laser light spot within the first camera and the respective candidates of matching point within the second camera, to obtain a result of the matching; and the calculating module is adapted for obtaining an image position within the second camera that matches with the image position within the first camera according to the result of the matching, and determining a precise position of the laser light spot according to a second mapping relationship in the demarcation database.

In the inventive structured-light based measuring system, the demarcation database is obtained by a demarcating module through a demarcating process including: demarcating the first mapping relationship between an image position of each laser light spot within the first camera and the sequence number as well as the low-precision depth of the laser light spot, demarcating the second mapping relationship between an image position of each laser light spot within the second camera and the sequence number as well as the high-precision depth of the laser light spot, and storing the demarcated first and second mapping relationships in a memory to form the demarcation database for the use by the matching process and the calculating process.

In the inventive structured-light based measuring system, during the demarcating process by the demarcating module, a position of a laser output port relative the first camera is adjusted to prevent image positions of any two laser light spots within the first camera from overlapping with each other.

In the inventive structured-light based measuring system, the distance between the second camera and the laser output port is larger than the distance between the first camera and the laser output port.

In the inventive structured-light based measuring system, functions of the demarcating module and the matching module are implemented in a condition that image positions at different depths of the same laser light spot are surrounded by a geometric region.

In the inventive structured-light based measuring system, the precise position of the laser light spot is obtained by an interpolating method applied on the image position in the second camera and the high-precision depth during the calculating process.

In the inventive structured-light based measuring system, conducting matching according to the image position of the laser light spot within the first camera and the respective candidates of matching point within the second camera by the matching module includes: searching for a reference matching pair according to a luminance difference of images of the laser light spot; and determining the optimal matching point using the reference matching pair.

In the inventive structured-light based measuring system, during the conducting matching according to the image position of the laser light spot within the first camera and the respective candidates of matching point within the second camera by the matching module, before searching for a reference matching pair according to a luminance difference of images of the laser light spot, the matching module is further adapted for conducting a 3D reconstruction of the candidates of matching point, to obtain a depth of each of the candidate of matching point; and conducting initial selection among the candidates of matching point according to the depths of the candidates of matching point.

The structured-light based measuring method and a structured-light based measuring system using such a method of the present invention are advantageous in that the measurement precision of the system is greatly improved by adding the second camera for fine measurement to the existing structured-light measuring system.

In the invention, a demarcation database is established through the demarcating process, so that the structured-light measuring process is simplified. The image positions of any two laser light spots within the first camera do not overlap with each other, so that the accuracy of the mapping relationship between the image position and the depth of each laser light spot (that is formed on the measured object) within the first camera is ensured during the demarcating process. The distance between the second camera and the laser output port is larger than the distance between the first camera and the laser output port, so that a mapping relationship between the image position and the depth that is provided by the second camera is more precise than that provided by the first camera. A geometric region is used for surrounding image positions at various depths of the same laser light spot in order to conduct the demarcating process and the matching process, and the matching speed may be accelerated. During the calculating process, the precise position of the laser light spot is obtained by an interpolating method applied on the sequence of the image position in the second camera and the depth, so that multiple precise depths of the measured objected may be obtained. The matching is conducted according to the image position of the laser light spot within the first camera and the respective candidates of matching point within the second camera during the matching process, so that the matching result may be obtained more easily, simply and quickly.

BRIEF DESCRIPTION OF THE DRAWINGS

The present invention is now further described below with reference to the drawings and embodiments, in which.

DETAILED DESCRIPTION OF PREFERRED EMBODIMENTS

Preferred embodiments of the present invention are described in detail below in connection with the attached drawings.

Figure 1:
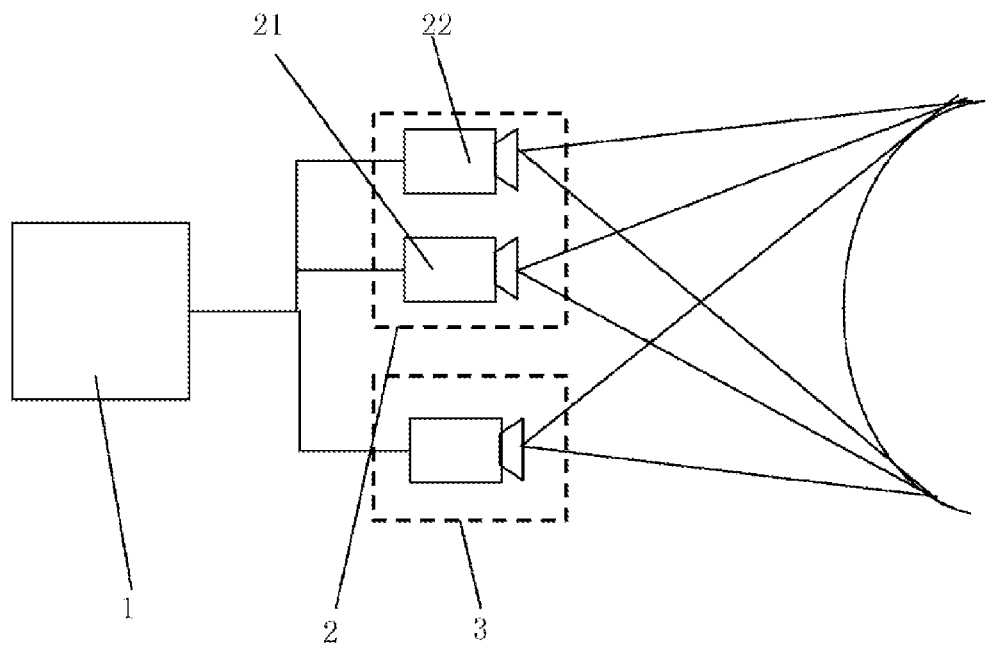
FIG. 1 is a schematic structural diagram of a structured-light based measuring system according to a preferred embodiment of the invention.

As shown in FIG. 1, a structured-light based measuring method of the invention includes a matching process and a calculating process, in which the used demarcation database is obtained through a demarcating process.

Figure 2:
FIG. 2 is a schematic diagram showing the images of laser light spots that are formed within a first camera of a structured-light based measuring system according to a preferred embodiment of the invention.
Figure 3:
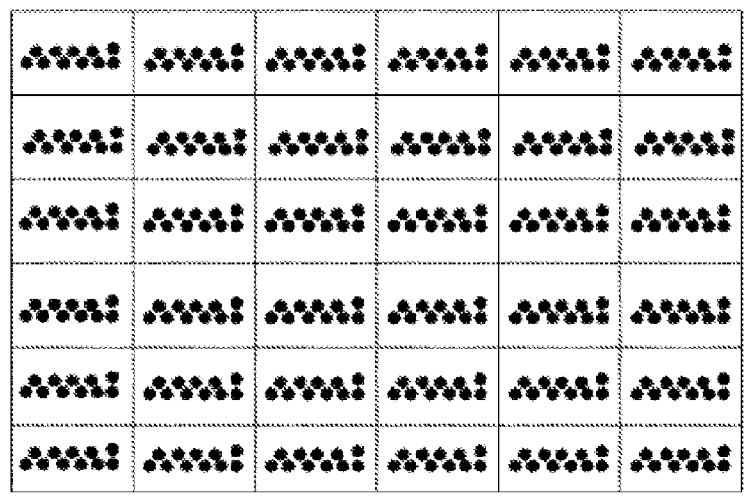
FIG. 3 is a schematic diagram showing the division of image regions of laser light spots that are formed within the first camera of the structured-light based measuring system according to the preferred embodiment of the invention.
Figure 6:
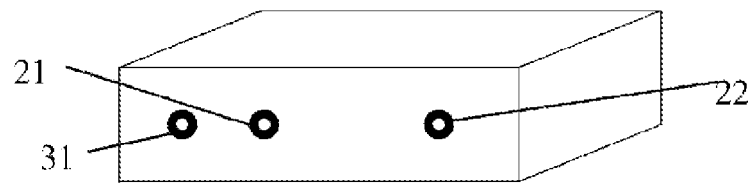
FIG. 6 is a schematic structural diagram showing a structured-light based measuring system according to a preferred embodiment of the invention.

During the demarcating process, a first mapping relationship between an image position of each laser light spot within a first camera 21 and the sequence number as well as a low-precision depth (i.e. scene depth) of the laser light spot is determined. Particularly, in the case of the first camera 21, it is assumed that an image position of a laser light spot i at a depth within the first camera 21 is denoted by $(u^i_j, v^i_j)$, and the image distributions of any two laser light spots are prevented from overlapping with each other by adjusting the position of the laser output port 31 (as shown in FIG. 6) with respect to the first camera 21, as shown in the schematic image in FIG. 2. Each of the point sets that are not overlapped and are separated in FIG. 2 represents an image distribution of one laser light spot at various depths, and each point in the point set represents an image position of a laser light spot corresponding to the point set at a different depth. In this case, data recorded for the laser light spot i may be denoted by $\{\{(u^i_1, v^i_1), z^i_1\}, \ldots, \{(u^i_j, v^i_j), z^i_j\}, \ldots, \{(u^i_{N_i}, v^i_{N_i}), z^i_{N_i}\}\}$, here, $N_i$ denotes the number of the demarcated images of the laser light spot i at various depths. In practice, to accelerate the matching, the point set may be surrounded by a regular geometric region in a shape such as a rectangle and an ellipse. Thus, the data recorded for the laser light spot i is denoted by $\{Param_i, \{(u^i_1, v^i_1), z^i_1\}, \ldots, \{(u^i_j, v^i_j), z^i_j\}, \ldots, \{(u^i_{N_i}, v^i_{N_i}), z^i_{N_i}\}\}$, here $N_i$ denotes the number of the demarcated images of the laser light spot i at various depths, and $Param_i$ denotes a parameter for the region surrounding the point set, which may be the maximum and minimum horizontal and vertical coordinates of rectangle corners for a rectangular region surrounding the point set, or a center point and major and minor axes of an ellipse for an elliptic region surrounding the point set. FIG. 3 shows schematic division by rectangular surrounding regions.

Figure 4:
FIG. 4 is a schematic diagram showing the images of neighboring laser light spots that are formed within a second camera of a structured-light based measuring system according to a preferred embodiment of the invention.
Figure 5:
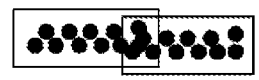
FIG. 5 is a schematic diagram showing the division of image regions of laser light spots that are formed within a first camera of a structured-light based measuring system according to a preferred embodiment of the invention.

Further, during the demarcating process, a second mapping relationship between an image position of each laser light spot within a second camera 22 and the sequence number as well as a high-precision depth of the laser light spot is determined. Particularly, in the case of the second camera 22, it is assumed that an image position of a laser light spot i at a depth $Z^i_j$ within the second camera 22 is denoted by $(u^i_j, v^i_j)$, in this case, data recorded for the laser light spot i may be denoted by $\{\{(u^i_1, v^i_1), z^i_1\}, \ldots, \{(u^i_j, v^i_j), z^i_j\}, \ldots, \{(u^i_{N_i}, v^i_{N_i}), z^i_{N_i}\}\}$, here, $N_i$ denotes the number of experimental data of the laser light spot i. It shall be noted that the image positions of two laser light spots might be overlapped, as schematically shown in FIG. 4. In practice, to accelerate the matching, the point set may be surrounded by a regular geometric region in a regular shape such as a rectangle and an ellipse. Thus, the data recorded for the laser light spot i is denoted by $\{Param_i, \{(u^i_1, v^i_1), z^i_1\}, \ldots, \{(u^i_j, v^i_j), z^i_j\}, \ldots, \{(u^i_{N_i}, v^i_{N_i}), z^i_{N_i}\}\}$, here $N_i$ denotes the number of the experimental data of the laser light spot i, and $Param_i$ denotes a parameter for the region surrounding the point set, which may be the maximum and minimum horizontal and vertical coordinates of rectangle corners for a rectangular region surrounding the point set, or a center point and major and minor axes of an ellipse for an elliptic region surrounding the point set. FIG. 5 shows schematic rectangular surrounding regions.

During the matching process, for example, the image position sequence within the first camera 21 is denoted by $(u^A_1, v^A_1), \ldots, (u^A_i, v^A_i), \ldots, (u^A_M, v^A_M)$, and the image position sequence within the second camera 22 is denoted by $(u^B_1, v^B_1), \ldots, (u^B_j, v^B_j), \ldots, (u^B_N, v^B_N)$. Any possible point among the image position sequence within the second camera 22 that matches the image position $(u^A_i, v^A_i)$ within the first camera 21 may be determined by the following steps (1), (2) and (3).

At step (1), the sequence number and a low-precision depth of the laser light spot are determined according to an image position within the first camera 21 and the recorded table (e.g. the demarcation database) in the first camera 21.

Because the image point sets of the various laser light spots do not overlap with each other within the first camera 21, according to the image position $(u^A_i, v^A_i)$ within the first camera 21, the sequence number and a low-precision depth of a laser light spot corresponding to such image position may be determined directly (i.e. based on the first mapping relationship).

The determining of the sequence number and the low-precision depth may be as follows depending on different data in the recorded table obtained during the demarcation.

(A) If the point sets are not surrounded by geometric regions, in the case of an image position $(u^A_i, v^A_i)$ within the first camera 21, the recorded table is searched and an item thereof containing an image position $(u^i_j, v^i_j)$ having the most similarity to the image position $(u^A_i, v^A_i)$, i.e. $\{\{(u^i_1, v^i_1), z^i_1\}, \ldots, \{(u^i_j, v^i_j), z^i_j\}, \ldots, \{(u^i_{N_i}, v^i_{N_i}), z^i_{N_i}\}\}$ is searched out. The calculating of the similarity may be based on a distance similarity of $R=-\{(u^i_j-u^A_i)^2+(v^i_j-v^A_i)^2\}$.

(B) If the point sets are surrounded by geometric regions, the recorded table is searched to find an item thereof containing an image position $(u^A_i, v^A_i)$ falling within the geometric region, i.e. $\{Param_i, \{(u^i_1, v^i_1), z^i_1\}, \ldots, \{(u^i_j, v^i_j), z^i_j\}, \ldots, \{(u^i_{N_i}, v^i_{N_i}), z^i_{N_i}\}\}$. For example, in the case of a rectangular region, $Param_i$ is $min\_u^i$, $max\_u^i$, $min\_v^i$, $max\_v^i$, thus $min\_u^i \leq u^A_i \leq max\_u^i$ and $min\_v^i \leq v^A_i \leq max\_v^i$ shall be satisfied.

At step (2), according to the obtained sequence number of the laser light spot and the sequence number of the image position of the laser light spot within the first camera 21, the image distribution of the laser light spot within the second camera 22 is searched out and candidates of matching point are obtained based on the image distribution.

If the obtained sequence number of the laser light spot and the sequence number of the image position of the laser light spot within the first camera 21 are denoted by Index and T, respectively, the demarcated point data obtained from the demarcation data of the first camera 21 may be denoted by $\{(u_T^{Index}, v_T^{Index}), z_T^{Index}\}$.

The obtained sequence of the demarcated image distribution of the laser light spot within the second camera 22 may be denoted by $\{Param_{index}, \{(u_1^{index}, v_1^{index}), z_1^{index}\}, \ldots, \{(u_j^{index}, v_j^{index}), z_j^{index}\}, \ldots, \{(u_{N_{index}}^{index}, v_{N_{index}}^{index}), z_{N_{index}}^{index}\}\}$.

Candidates of demarcated point are searched out from the sequence of the demarcated image distribution of a laser light spot Index within the second camera 22 by a manner of obtaining a demarcated point within a range having a center $z_T^{Index}$, i.e. $z_T^{Index}-d \leq z_j^{Index} \leq z_T^{Index}+d$. Here, d denotes a matching search range that is defined manually.

If the number sequence of the satisfying demarcated points within the second camera 22 is denoted by $\{index_1, \ldots, index_p, \ldots, index_C\}$, for each element of the number sequence, any image point having satisfying similarity is determined from the image points $(u^B_1, v^B_1), \ldots, (u^B_j, v^B_j), \ldots, (u^B_N, v^B_N)$ in the second camera 22 by a method (A) or (B) below depending on the data of the recorded table obtained during the demarcation.

(A) In the case that the point sets are not surrounded by geometric regions, for each demarcated image point $\{(u_{index_p}^{Index}, v_{index_p}^{Index}), z_{index_p}^{Index}\}$ from the sequence of satisfying demarcated image points within the second camera 22, any of the image points $(u_1^B, v_1^B), \ldots, (u_j^B, v_j^B), \ldots, (u_N^B, v_N^B)$ that has satisfying similarity is determined as a candidate.

The calculation of the similarity may be based on a distance similarity $R=\{(u_{index_p}^{Index}-u_j^B)^2+(v_{index_p}^{Index}-v_j^B)^2\}$, here $R \geq$ Threshold and Threshold is a predefined value.

(B) In the case that the point sets are surrounded by geometric regions, any of the image points $(u_1^B, v_1^B), \ldots, (u_j^B, v_j^B), \ldots, (u_N^B, v_N^B)$ that falls within the surrounding region $Param_{Index}$ is determined.

For example, in the case of a rectangular surrounding region, the surrounding region $Param_{Index}$ defined by $\{min\_u^{index}, max\_u^{Index}, min\_v^{Index}, max\_v^{index}\}$ shall meet conditions of $min\_u^{Index} \leq u_j^B \leq max\_u^{Index}$ and $min\_v^{Index} \leq v_j^B \leq max\_v^{Index}$.

At step (3), the matching process is completed based on the known sequence of image positions $(u_1^A, v_1^A), \ldots, (u_j^A, v_j^A), \ldots, (u_M^A, v_M^A)$ within the first camera 21 and the candidates of matching point therefor within the second camera 22.

As described above, the initial measurement of the depths of the laser light spot array forming image distribution within the first camera 21 has been completed, and the candidates of matching point from the point array within the second camera 22 are found. In the case of a certain point $(u_i^A, v_i^A)$ within the first camera 21, if the depth of such point is determined as $Z_i^A$ in the first camera 21 and candidates of matching point in the second camera 22 for such point are $(u_j^B, v_j^B)$, $(u_k^B, v_k^B)$ and $(u_l^B, v_l^B)$ (the description is made here by an example of three candidates, but the present invention is not limited to this), an object at the present stage is to find the best matching point for the point $(u_i^A, v_i^A)$ among the candidates of matching point, e.g. by below steps (A), (B), (C) and (D).

(A) 3D reconstruction for the candidates of matching point is conducted. Here, Binocular Stereo Vision technologies may be used. The 3D reconstruction with a high precision may be completed once the binocular demarcating of the first and second cameras 21 and 22 is conducted. If the candidates of matching point $(u_j^B, v_j^B)$, $(u_k^B, v_k^B)$ and $(u_l^B, v_l^B)$ are respectively paired with the point $(u_i^A, v_i^A)$ for the purpose of the 3D reconstruction, 3 depths $z_j^{AB}$, $z_k^{AB}$, and $z_l^{AB}$ may be obtained.

(B) Selection is made based on the depths. Particularly, an initial selection among the 3 depths may be made using $z_i^A$. If a measurement precision of $z_i^A$ measured by the first camera 21 is d, any candidate of matching point that corresponds to a depth exceeding a range of $$\left(z_i^A - \frac{d}{2}, z_1^A + \frac{d}{2}\right)$$

is discarded. Further, depending on various applications, if the shot scene depth range is limited, an allowable variation range such as a range from 1 to 5 meters may be provided for the reconstructed depth, for the purpose of the selection. For the ease of description, the candidate of matching point $(u_l^B, v_l^B)$ is discarded at this step, for example.

(C) The searching for a reference matching pair is conducted. Particularly, the optimal matching point for the point $(u_i^A, v_i^A)$ shall be searched out from the remaining candidates of matching point. For example, if the candidate of matching point $(u_l^B, v_l^B)$ is discarded as above, an optimal matching point shall be searched out from the candidates of matching point of $(u_j^B, v_j^B)$ and $(u_k^B, v_k^B)$, which is relatively difficult because both of the candidates $(u_j^B, v_j^B)$ and $(u_k^B, v_k^B)$, which have a precision better than that of $z_i^A$, satisfy the precision requirement. Therefore, the selection can be made merely based on the image positions of the laser light spot in the camera. In this case, it is necessary to find a reference matching pair from the first and second cameras 21 and 22.

If the laser output port 31 is arranged between the first and second cameras, the common visual field is relatively large, which is preferable. Typically, a regular laser light spot array is obtained by the effects of both interference and diffraction of a point light source, and is characterized in that the luminance of spots close to the center of the light source is higher due to more interference than spots at the periphery of the light source, as a result, the areas of images of the spots close to the center of the light source are larger than those of the spots at the periphery of the light source. With such a character and the large common imaging visual field of the first and second cameras, a statistical method is used to search for a reliable reference matching pair as described below.

In the two pictures within the first and second cameras 21 and 22, the images of the light spots are sorted according to their areas, N light spot images with the largest areas are selected, a geometrical center position of the selected light spot images is calculated, and light spot images closest to the calculated geometrical center position are searched out, to obtain two light spot images within the first and second cameras 21 and 22 as the reliable reference matching pair.

It shall be noted that the above method for selecting reference matching points cannot ensure the reliability in the direction Y of the coordinate system, because of the comparable luminance of light spots along the same vertical line close to the central region. However, the reliability in the direction X of the coordinate system is high due to the relatively large luminance difference in the horizontal direction. Therefore, the X coordinate of the center region with high luminance can be obtained through the statistics above. Fortunately, the epipolar constraint can be used for the direction Y. Further in practice, a relatively regular laser light spot array is provided, and the candidates of matching point selected by the demarcation are typically around the same horizontal level and thus have very close Y coordinates, hence it is not necessary to conduct selection in the direction Y.

(D) The optimal matching points are obtained through the reference matching pair. If the obtained reference matching pairs are $(x_{max}^A, v_{max}^A)$, $(x_{max}^B, v_{max}^B)$, merely the comparison in the direction X is required as described above. That is, merely $|x_{max}^B - u_j^B|$ and $|x_{max}^B - u_k^B|$ are required for comparing with $|x_{max}^A - u_i^A|$. One of $|x_{max}^B - u_j^B|$ and $|x_{max}^B - u_k^B|$ that is closer to $|x_{max}^A - u_i^A|$ is at a distance to the reference matching point in the second camera 22 that is the closest to the distance from the point $(u_i^A, v_i^A)$ to the same reference matching point in the first camera 21 in the direction X, and thus is selected as the optimal matching point, which is assumed as $(u_j^B, v_j^B)$ here. As such, the matching between the image position in the first camera 21 and the image position in the second camera 22 is finished, and $z_j^{AB}$ represents the depth of the point $(u_i^A, v_i^A)$ in the first camera 21 with the higher precision.

Steps (A) and (B) above relate to the coarse selection and may be selected for performing as desired.

In addition, the following general assignment algorithm may be used for implementing the matching between the sequence $(u_i^A, v_i^A), \ldots, (u_j^A, v_j^A), \ldots, (u_M^A, v_M^A)$ of known image positions in the first camera 21 and the respective candidates of matching point in the second camera 22.

If $\{p_1, \ldots, p_i, \ldots, p_M\}$ and $\{q_1, \ldots, q_i, \ldots, q_M\}$ denote two 2D labeling sequences, a corresponding similarity matrix C may be calculated as $C=\{c_{i,j}\}$, here $C_{i,j}$ represents the $$F = \sum_{i=1}^{M}\sum_{j=1}^{M} c_{ij} x_{ij}.$$

similarity of $p_i$ and $q_j$. The total similarity F may be defined as

Here, $$\sum_{i=1}^{M} x_{ij} = 1, j = 1, 2 \ldots, M, \sum_{j=1}^{N} x_{ij} = 1, i = 1, 2 \ldots, M$$

and $x_{ij}$ is equal to 0 or 1. $x_{ij}$ is an M×N matrix.

The maximum of the total similarity F may be obtained by varying $x_{ij}$. If $x_{ij}=1$, it may be determined that $p_i$ and $q_j$ forms a matching pair. Otherwise, $p_i$ and $q_j$ do not form a matching pair.

The matching process above involves a relatively large amount of calculation due to the assumption that any of $p_i$ and $q_j$ might form a matching pair, which is a Non-deterministic Polynomial (N-P) problem. Many optimized algorithms were proposed for the N-P problem, but involve a calculation amount which is dramatically increased along with the increase of the size of the similarity matrix C.

If the similarity matrix C is characterized by $$C = \begin{bmatrix} A & 0 \\ 0 & B \end{bmatrix},$$

the N-P problem may be simplified to apply the above calculation on the matrix A and the matrix B, and thus the calculation amount involved is decreased greatly. Therefore, $$C = \begin{bmatrix} A & 0 \\ 0 & B \end{bmatrix}$$

is preferably achieved through various constraint conditions such as the epipolar constraint of a stereo vision system and image similarity in the practice.

The similarity matrix C is calculated in the term of similarity of properties such as an image area, an image major axis, and an image minor axis, and information such as the epipolar constraint of a stereo vision system which is known to those skilled in the art may be taken into consideration.

After obtaining the matrix C, if $$C = \begin{bmatrix} A & 0 \\ 0 & B \end{bmatrix},$$

the matrixes A and B are calculated through known methods such as the Hungary algorithm and the Branch-and-Bound Method.

During the calculation, the precise position of the laser light spot is determined according to the result of the matching.

Based on the obtained sequence number and low-precision depth of the laser light spot, the image position of the light spot in the second camera 22 is obtained, and a precise position of the light spot may be obtained through an interpolating method according to the second mapping relationship between the image position of a light spot within the second camera 22 and the sequence number as well as the high-precision depth of the light spot.

Figure 7:
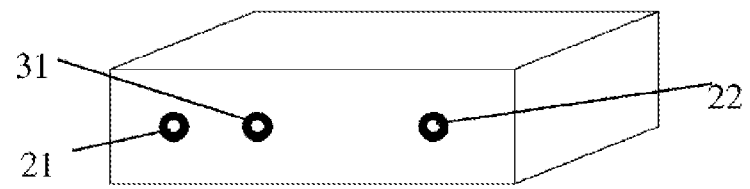
FIG. 7 is a schematic structural diagram showing a structured-light based measuring system according to a preferred embodiment of the invention.

As shown in FIGS. 6 and 7, the distance between the second camera 22 and the laser output port 31 is larger than that between the first camera 21 and the laser output port 31, and the laser output port 31 is at a side of the first camera 21 that is opposite to the second camera 22, or arranged between the first and second camera 21 and 22. As shown in FIG. 6, the laser output port is located at a side of the first camera 21 that is opposite to the second camera 22, and the distance between the second camera 22 and the laser output port 31 is larger than the distance between the first camera 21 and the laser output port 31. As shown in FIG. 7, the laser output port 31 is arranged between the first and second camera 21 and 22, and the distance between the second camera 22 and the laser output port 31 is larger than the distance between the first camera 21 and the laser output port 31. In this way, a mapping relationship between the image position and the depth provided by the second camera 22 is more precise than that provided by the first camera 21, and the precision of the second camera 22 may be adjusted as desired actually. The position of the laser output port 31 may be adjusted as desired as long as the distance between the second camera 22 and the laser output port 31 is larger than the distance between the first camera 21 and the laser output port 31.

The embodiments of the present invention are described as above in conjunction with the drawings. However, the present invention is not limited to above detailed embodiments which are only illustrative and not for limiting. Under the enlightenment of the present invention, those skilled in the art can make many variations, without departing from the purpose of the invention and the scope claimed in the appended claims, and all the variations shall fall into the scope of the invention.

The invention claimed is:

1. A structured-light based measuring method, comprising:
a matching process, which includes obtaining a sequence number and a low-precision depth of a laser light spot based on an image position of the laser light spot within a first camera (21) according to a first mapping relationship in a demarcation database, searching for image positions of the laser light spot within a second camera (22) according to the sequence number and the low-precision depth of the laser light spot to obtain candidates of matching point, and conducting matching according to the image position of the laser light spot within the first camera (21) and the respective candidates of matching point within the second camera (22), to obtain a result of the matching; and a calculating process, which includes obtaining an image position within the second camera (22) that matches with the image position within the first camera (21) according to the result of the matching, and determining a precise position of the laser light spot according to a second mapping relationship in the demarcation database, wherein the demarcation database is obtained by a demarcating process comprising:
demarcating the first mapping relationship between an image position of each laser light spot within the first camera (21) and the sequence number as well as the low-precision depth of the laser light spot, demarcating the second mapping relationship between an image position of each laser light spot within the second camera (22) and the sequence number as well as the high-precision depth of the laser light spot, and storing the demarcated first and second mapping relationships in a memory to form the demarcation database for the use by the matching process and the calculating process.

2. The method of claim 1, wherein during the demarcating process, a position of a laser output port (31) relative the first camera (21) is adjusted to prevent image positions of any two laser light spots within the first camera (21) from overlapping with each other.

3. The method of claim 2, wherein a distance between the second camera (22) and the laser output port (31) is larger than a distance between the first camera (21) and the laser output port (31).

4. The method of claim 1, wherein the demarcating process and the matching process are performed in a condition that image positions at different depths of the same laser light spot are surrounded by a geometric region.

5. The method of claim 1, wherein the precise position of the laser light spot is obtained by an interpolating method applied on the image position in the second camera (22) and the high-precision depth during the calculating process.

6. The method of claim 1, wherein conducting matching according to the image position of the laser light spot within the first camera (21) and the respective candidates of matching point within the second camera (22) during the matching process comprises:
searching for a reference matching pair according to a luminance difference of images of the laser light spot; and
determining the optimal matching point using the reference matching pair.

7. The method of claim 6, wherein during the conducting matching according to the image position of the laser light spot within the first camera (21) and the respective candidates of matching point within the second camera (22) in the matching process, before searching for a reference matching pair according to a luminance difference of images of the laser light spot, the method further comprises:
conducting a 3D reconstruction of the candidates of matching point, to obtain a depth of each of the candidate of matching point; and
conducting initial section among the candidates of matching point according to the depths of the candidates of matching point.

8. A structured-light based measuring system, comprising a processing system (1), an imaging system (2) and a projecting system (3), wherein the imaging system (2) comprises a first camera (21) and a second camera (22), the projecting system (3) comprises a laser generator for generating laser light, and the processing system (1) comprises a matching module and a calculating module,
the matching module is adapted for obtaining a sequence number and a low-precision depth of a laser light spot based on an image position of the laser light spot within a first camera (21) according to a first mapping relationship in a demarcation database, searching for image positions of the laser light spot within a second camera (22) according to the sequence number and the low-precision depth of the laser light spot to obtain candidates of matching point, and conducting matching according to the image position of the laser light spot within the first camera (21) and the respective candidates of matching point within the second camera (22), to obtain a result of the matching; and
the calculating module is adapted for obtaining an image position within the second camera (22) that matches with the image position within the first camera (21) according to the result of the matching, and determining a precise position of the laser light spot according to a second mapping relationship in the demarcation database,
wherein the demarcation database is obtained by a demarcating module through a demarcating process comprising:
demarcating the first mapping relationship between an image position of each laser light spot within the first camera (21) and the sequence number as well as the low-precision depth of the laser light spot, demarcating the second mapping relationship between an image position of each laser light spot within the second camera (22) and the sequence number as well as the high-precision depth of the laser light spot, and storing the demarcated first and second mapping relationships in a memory to form the demarcation database for the use by the matching process and the calculating process.

9. The system of claim 8, wherein during the demarcating process by the demarcating module, a position of a laser output port (31) relative the first camera (21) is adjusted to prevent image positions of any two laser light spots within the first camera (21) from overlapping with each other.

10. The system of claim 9, wherein a distance between the second camera (22) and the laser output port (31) is larger than a distance between the first camera (21) and the laser output port (31).

11. The system of claim 8, wherein functions of the demarcating module and the matching module are implemented in a condition that image positions at different depths of the same laser light spot are surrounded by a geometric region.

12. The system of claim 8, wherein the precise position of the laser light spot is obtained by an interpolating method applied on the image position in the second camera (22) and the high-precision depth during the calculating process.

13. The system of claim 8, wherein conducting matching according to the image position of the laser light spot within the first camera (21) and the respective candidates of matching point within the second camera (22) by the matching module comprises:
searching for a reference matching pair according to a luminance difference of images of the laser light spot; and
determining the optimal matching point using the reference matching pair.

14. The system of claim 13, wherein during the conducting matching according to the image position of the laser light spot within the first camera (21) and the respective candidates of matching point within the second camera (22) by the matching module, before searching for a reference matching pair according to a luminance difference of images of the laser light spot, the matching module is further adapted for conducting a 3D reconstruction of the candidates of matching point, to obtain a depth of each of the candidate of matching point; and conducting initial section among the candidates of matching point according to the depths of the candidates of matching point.

* * * * *